UNITED STATES PATENT OFFICE.

FREDERICK W. SPANUTIUS, OF HASTINGS-UPON-HUDSON, NEW YORK, ASSIGNOR TO PAN CHEMICAL COMPANY, OF HASTINGS-UPON-HUDSON, NEW YORK, A CORPORATION OF NEW YORK.

PROCESS FOR MAKING A DECOLORIZER.

1,135,216.  Specification of Letters Patent.  Patented Apr. 13, 1915.

No Drawing.  Application filed February 7, 1912.  Serial No. 675,926.

*To all whom it may concern:*

Be it known that I, FREDERICK W. SPANUTIUS, of Hastings-upon-Hudson, in the county of Westchester and State of New York, have invented a new and useful Process for Making a Decolorizer, of which the following is a specification.

My invention relates to the manufacture of decolorizer and my main object is to provide a decolorizer which is not only superior to those heretofore known but is cheaper to manufacture.

My invention consists mainly in utilizing a filter press cake to make a decolorizer, the cake being heretofore a waste product in processes for the production of a decolorizer. Of these processes any suitable one may be used but I prefer that which consists in dissolving argols, which are unrefined or crude tartar known as potassium bitartrate, in caustic soda to decompose the coloring-matter or to render it insoluble, then introducing carbonate of soda to precipitate the lime, then adding a compound of potassium, then introducing a decoloring agent and finally precipitating the bitartrate of potash directly from the mixture by the introduction of an acid, this process being more fully described in U. S. Letters Patent to Jarrett No. 572345 dated December 1, 1896.

The residue obtained from the filtration step of the above described process is what I use and it is usually in the form of a filter press cake and usually contains 50% moisture, the remainder being crude fiber of the original argols with small quantities of lime-salts and sand. I have discovered that if this is burned in a closed retort provided with a small opening for the escape of vapor and gases formed during the carbonization there is obtained upon heating to the proper temperature until the carbonization is complete, a residual vegetable charcoal which is an excellent decolorizer. This residue contains much less of lime salts than bone-black which has heretofore been used, and as it is made from a substance which is almost free from nitrogen it does not contain those nitrogenous substances present to a considerable extent in bone black. It gives a char which is flaky and more porous and therefore acts as a clarifier in holding back more perfectly the colloidal or uncrystallizable substances present in the extract which have a tendency to coat or clog a filter and retard or prevent filtration completely. Its density is high which insures clarification by settling and avoiding tedious filtration. The mineral matters contained are very small and of such a character that part is entirely inert and the small portion which enters solution is entirely and easily removed in the ordinary process of purification of liquors without resorting to extra treatments.

An important advantage is that the product is made from a part of the original tartrate-bearing material and so avoids the introduction of elements and substances foreign to the tartrates or their natural source.

I have found that my process results in a product which is superior in every way to any decolorizer of tartrate solutions heretofore known.

The cost is very small when compared to the value as a decolorizer. Furthermore it provides the cheapest and best method of disposal of a residue which has heretofore been hauled off at some expense and this is especially important in a factory at some distance from a garbage dumping ground. Moreover the gases given off in the retort are not a nuisance because they are combustible and can be entirely consumed in the furnace itself.

Another advantage in the use of my process is that the expense and dirt connected with handling and grinding the materials heretofore used is done away with because the product is made from an article which has already been very finely ground.

The product resulting from my process is primarily for use in decolorizing, purifying and clarifying the solutions extracted from the materials of which the insoluble residue is subjected to my new process.

In the particular case described above I treat by my process the filter press cake from argols and lees, the product resulting being used for the decolorization, purification and clarification of liquors used in the production of cream of tartar, Rochelle salts, tartaric acid and such compounds as are made from argols and lees and other crude tartrates and tartaric acid substances.

What I claim is:—

1. The method of making a decolorizer consisting in treating argols with an alkali, separating the residue from the solution and heating the residue until carbonization is complete.

2. The method of making a decolorizer consisting in dissolving argols in caustic soda, adding potassium chlorid, separating the residue from the solution and heating the residue until carbonization is complete.

3. The method of making a decolorizer consisting in treating argol residue with hot water, separating the solution from the residue which remains after said treatment and heating said last-mentioned residue until carbonization is complete.

4. The method of making a decolorizer consisting in first placing in a retort a residue consisting of about 50% moisture and the remainder being crude fiber of argols, lime salts and sand, then heating until carbonization is complete, allowing the vapor formed to pass off during the heating.

5. The method of making a decolorizer consisting in dissolving argols in caustic soda to decompose the coloring matter, or to render it insoluble, adding a compound of potassium, and finally heating the residue until carbonization is complete.

6. The method of making a decolorizer consisting in dissolving argols in caustic soda to decompose the coloring matter, or to render it insoluble, introducing carbonate of soda to precipitate the lime, adding a compound of potassium, and finally heating the residue until carbonization is complete.

7. As an article of manufacture for decolorizing purposes a vegetable charcoal which is the product resulting from heating the residue extracted from argols consisting of fifty per cent. moisture and fifty per cent. extracted argol residue, from which all bitartrate of potash has been removed and consisting of organic matter which is almost entirely crude fiber together with sand and earthy salts.

FREDERICK W. SPANUTIUS.

Witnesses:
HENRY BILLIGMEYER,
DANIEL BUCKLEY.